United States Patent [19]

Van Brakel et al.

[11] Patent Number: 5,549,398
[45] Date of Patent: Aug. 27, 1996

[54] BEARING ARRANGEMENT, ROLLER BEARINGS FOR USE THEREIN, AND A METHOD FOR THE MANUFACTURE OF A PART OF THE BEARING ARRANGEMENT

[75] Inventors: Ronaldus J. Van Brakel, Driebergen; Frank P. Wardle, Bodegraven; Martin Verburgh, BA Amersfoort, all of Netherlands

[73] Assignee: SKF Industrial Trading & Development Company B.V., Netherlands

[21] Appl. No.: 285,382

[22] Filed: Aug. 3, 1994

[30] Foreign Application Priority Data

Aug. 6, 1993 [NL] Netherlands .................... 9301366

[51] Int. Cl.⁶ ......................................... F16C 33/58
[52] U.S. Cl. .................... 384/571; 384/492; 384/569
[58] Field of Search .................... 384/571, 569, 384/492, 570, 625, 912

[56] References Cited

U.S. PATENT DOCUMENTS

| | | | |
|---|---|---|---|
| 2,969,263 | 1/1961 | Lamson et al. | 384/463 |
| 3,853,602 | 12/1974 | Nakamura | 117/105 |
| 4,511,606 | 4/1985 | Ehrlich et al. | 427/386 |
| 4,714,359 | 12/1987 | Winter et al. | 384/571 |
| 5,222,816 | 6/1993 | Kondoh et al. | 384/492 |
| 5,375,933 | 12/1994 | Mizutani et al. | 384/492 |

*Primary Examiner*—Lenard A. Footland
*Attorney, Agent, or Firm*—Michael O. Warnecke; Daniel J. Hulseberg; Mayer, Brown & Platt

[57] ABSTRACT

The invention relates to a bearing arrangement and parts suitable for said arrangement, such as a roller bearing, which is suitable for the absorption of shock loads. To that purpose those parts which come into contact with each other under shock loads or great loads are provided on one of the adjacent outer contact surfaces facing each other with a friction-reducing coating. Such a coating may contain molybdenum or bronze and is suitably applied by means of a thermal spraying method, such as wire spraying. The bearing arrangements provided by the invention have a significantly longer operational life.

8 Claims, 3 Drawing Sheets

BEARING ARRANGEMENT, ROLLER BEARINGS FOR USE THEREIN, AND A METHOD FOR THE MANUFACTURE OF A PART OF THE BEARING ARRANGEMENT

The present invention relates to a bearing arrangement which is suitable for the absorption of shock loads and is provided with parts rotating concentrically relative to each other, which parts, as group, comprise a roller bearing and further at least a second adjacent roller bearing and/or housing part, whereby the parts can come into contact with each other at the adjacent, facing contact surfaces.

Such a bearing arrangement is known and is applied, for instance, in a steel-rolling mill. The bearing arrangements used therein often comprise different roller bearings rotating concentrically and at different speeds relative to each other. Apart from the radial forces that develop during rolling, shock loads develop in axial direction. When, due to an axial movement of the roller bearings, the contact surfaces of the roller bearings contact each other, the friction occurring during slip between the contact surfaces of the roller bearings suddenly causes a considerable rise in temperature, which very quickly falls again as the heat is dissipated to the roller bearings. The large and rapid fluctuations in temperature result in a so-called "white layer" on the contact surface. This white layer is characterized by different metallurgical properties to those of the bearing material, which is usually steel. With time microcracks appear at regular intervals in the contact surface, which in time will extend into the roller bearing. This problem is described in Die Wälzlager—W. J ürgensmeyer; Berlin, publishers Julius Springer, 1937. When microcracks have appeared in the contact surface, the roller bearing must be replaced in order to avoid damage to the bearing arrangement resulting in unplanned standstill of the rolling process.

It is the object of the present invention to avoid the occurrence of large temperature fluctuations at the contact surfaces which is the cause of microcracks, and to provide a bearing arrangement with a longer operational life.

To that purpose the bearing arrangement according to the invention is characterized in that of at least two adjacent, facing contact surfaces one contact surface is coated with a friction-reducing layer.

The friction-reducing layer lengthens the time during which slip between the contact surfaces of different roller bearings and/or housing parts occurs, while there is less heat generation per unit of time. It takes longer before the roller bearings have the same relative speed, allowing for the friction heat to be removed over a longer period of time. Consequently the temperature at the contact surface does not rise so quickly and the occurrence of microcracks is avoided or at least delayed. As a result the bearing arrangement has a longer operational life.

The invention further relates to a method for the manufacture of a part of the bearing arrangement described above, whereby the part has at least one outer contact surface.

The method according to the invention is characterized in that at least one outer contact surface is coated by thermic spraying with a friction-reducing layer.

Thus a friction-reducing layer is applied in an effective manner, i.e. the layer builds up relatively quickly.

According to one preferred embodiment the friction-reducing layer is applied by wire spraying.

This method allows the friction-reducing layer to be applied economically.

The invention further relates to a roller bearing for use in a bearing arrangement according to the invention, which is characterized in that at least one of its contact surfaces is coated with a friction-reducing layer.

The invention will now be further elucidated with the aid of the drawing illustrating one embodiment of the invention.

FIG. 3a shows the temperature fluctuation near uncoated contact surfaces resulting from axial shock loads occurring in a bearing arrangement in a laboratory simulation, while

Figure 1:
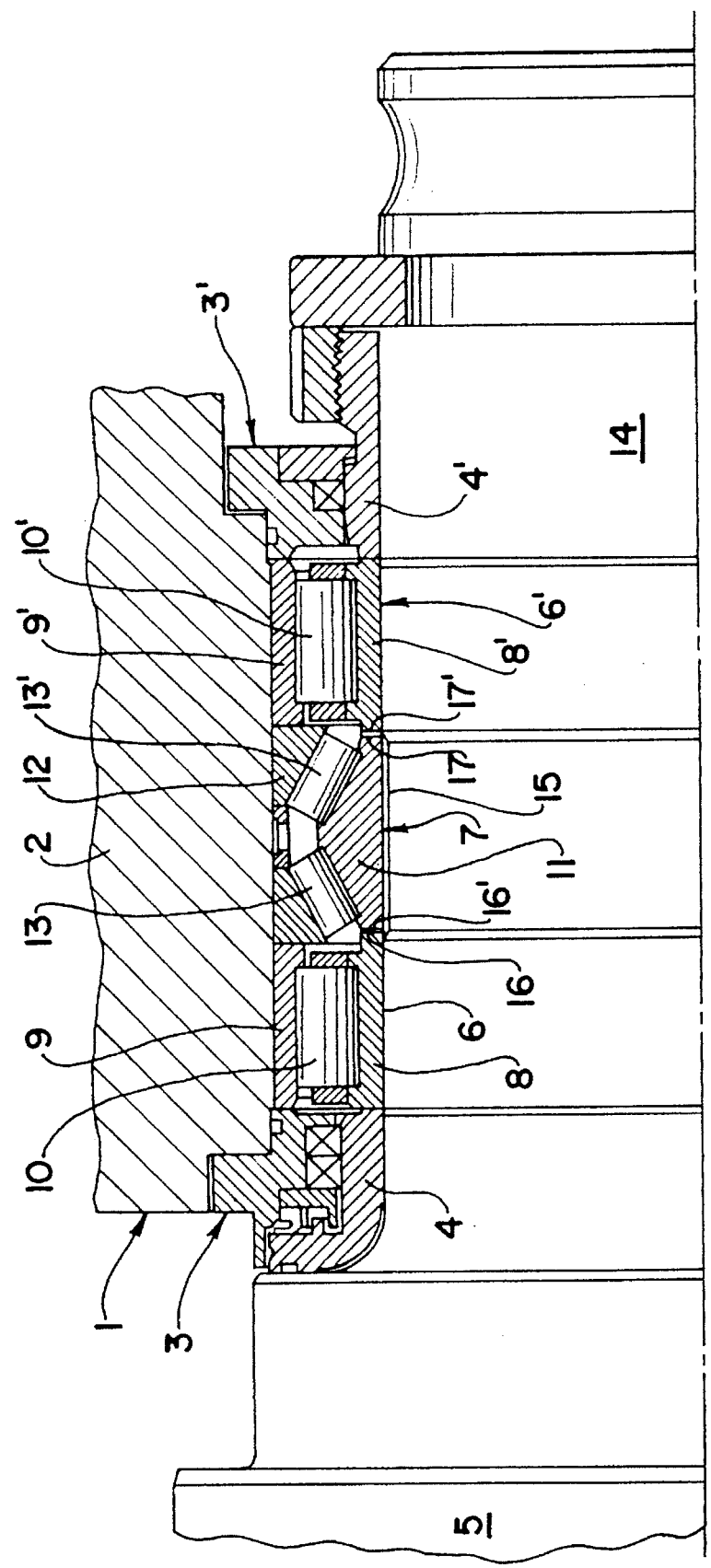
FIG. 1 is half of a longitudinal section of a bearing arrangement according to the invention.
Figure 2:
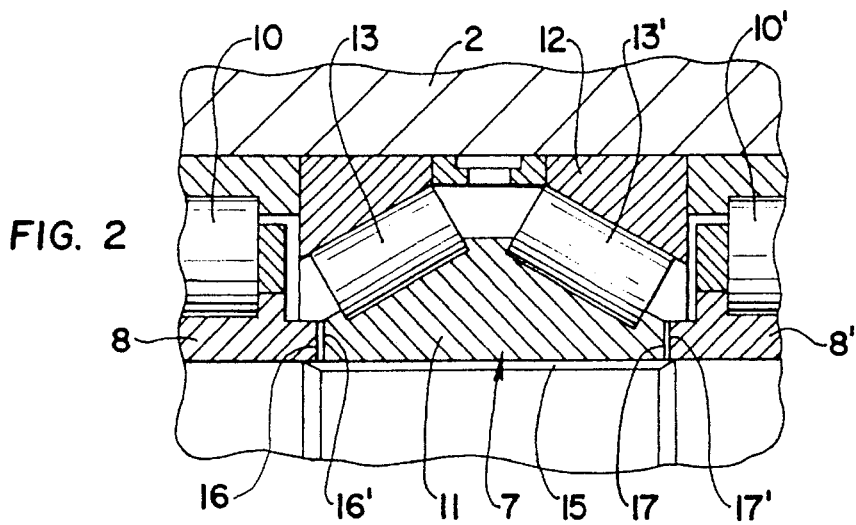
FIG. 2 shows an enlarged central part of FIG. 1.

FIG. 1 shows part of a bearing arrangement 1, in which reference number 2 indicates a housing to which are attached two housing parts 3 and 3' for the purpose of keeping together the roller bearings which are described below. Apart from seals which are not described in detail, the housing parts 3 and 3' comprise clamping plates 4, 4' which are rotatable and are considered to be part of the housing. The clamping plate 4, in turn, is in contact with a roller 5. Between the clamping plates 4, 4' and the housing 2 two cylindrical roller bearings 6, 6' are positioned, and between said cylindrical roller bearings a taper roller bearing 7 is located. The roller bearings 6, 6' and 7 are positioned concentrically and adjacent to each other. The cylindrical roller bearings 6, 6' comprise an inner race ring 8 respectively 8', an outer race ring 9 respectively 9' and rotating bodies 10 respectively 10', of which only one is shown for each cylindrical roller bearing 6 respectively 6'. The double taper roller bearing 7 comprises an inner race ring 11, an outer race ring 12 and inbetween, at an angle to each other, two rows of rotating bodies 13,13' respectively, showing one rotating body of each row of rotating bodies. The inside diameter of the inner race rings 8, 8' and 11 are identical. The inner race rings 8 and 11 can come into contact at the contact surfaces 16,16' respectively and the inner race rings 11 and 8' can come into contact at contact surfaces 17',17 respectively. In the bearing arrangement outlined here, the contact surfaces extend radially, as shown clearly enlarged in FIG. 2. The roller 5 has a roller shaft 14 whose outside diameter is substantially equal to the inside diameter of the inner race rings 8, 8' of the cylindrical roller bearings 6, 6'. At the height of the inner race ring 11 of the double taper roller bearing 7 the diameter of the roller shaft 14 is somewhat smaller thus forming a gap 15, so that the inner race ring 11 cannot come into contact with the roller shaft 14.

The bearing arrangement 1 operates as follows: the weight of the roller 5 and forces during the rolling process produce a radial load on the cylindrical roller bearings 6, 6' exerted by the roller shaft 14. During the rolling process also intermittent axial shock forces occur, causing the bearing arrangement 1 to be loaded in an axial direction. These forces must not be absorbed by the cylindrical roller bearings 6, 6', as this could damage the cylindrical roller bearings, but must be passed on to and absorbed by the taper roller bearing 7. This occurs as follows. An axial force towards the bearing arrangement, produced during the rolling process, is transmitted by the roller 5 via the clamping plate 4 to the inner race ring 8 of the cylindrical roller bearing 6. Because of the axial clearance in the cylindrical roller bearing 6 this is not loaded, and the contact surface 16 of the inner race ring 8 transmits the force via contact surface 16' to the inner race ring bearing 11. Via the conical rotating body 13', the outer race ring 12 of the taper roller bearing 7 and the outer race ring 9' of the cylindrical roller bearing 6' the force is transmitted to the housing 2 via housing part 3'. Because of the afore-mentioned axial clearance none of the cylindrical roller bearings 6, 6' is subjected to axial forces which are damaging to the bearing. The smaller diameter of the roller shaft 14 at the height of the taper roller bearing 7 ensures that the roller shaft 14 is not in contact with the inner race ring 11 of the taper roller bearing 7. As a result the taper roller bearing 7 is not loaded in axial direction. Consequently, without axial load, the inner race ring 11 will come to a halt due to contact with the stationary housing 2 via conical rotating bodies 13, 13' and the rotatable outer race ring 12, as opposed to the inner race rings 8, 8' of the radially loaded cylindrical roller bearings 6,6'. The axial force causes the contact surfaces 16, 16' of the inner race ring 8 of the cylindrical roller bearing 6, and the inner race ring 11 of the taper roller bearing 7 respectively, to come into contact with each other. The big difference in speed causes slip between the contact surface 16 of the rotating inner race ring 8 and the contact surface 16' of the not at all or much more slowly rotating inner race ring 11, whereby short temperature fluctuations occur with detrimental effects for the material properties on the contact surfaces 16, 16' of the respective inner race rings 8 and 11.

According to the invention, one of the contact surfaces of the facing contact surfaces 16, 16' (respectively 17', 17) of the inner race rings 8 and 11 (respectively 11 and 8') is provided with a friction-reducing layer.

In the case of axial loading, the contact surface of the uncoated inner race ring, usually made of steel, comes into contact with the friction-reducing layer of the contact surface of the coated inner race ring. With the coated contact surface according to the invention, the occurrence of undesired metallurgical changes such as the formation of a white layer and the development of microcracks, is avoided or at least delayed.

The friction-reducing layer may be applied by thermal spraying, such as plasma spraying or wire spraying. Wire spraying is preferable to other spraying methods. The material applied by means of thermal spraying is preferably bronze or molybdenum. The method of wire spraying of bronze and molybdenum is known to the expert. Wire spraying involves a work gas flow which is preferably air. In this way a bronze or molybdenum layer applied by wire spraying has a certain oxygen content. Oxygen-containing bronze and molybdenum layers applied in this way proved to be very suitable.

Figure 3A:
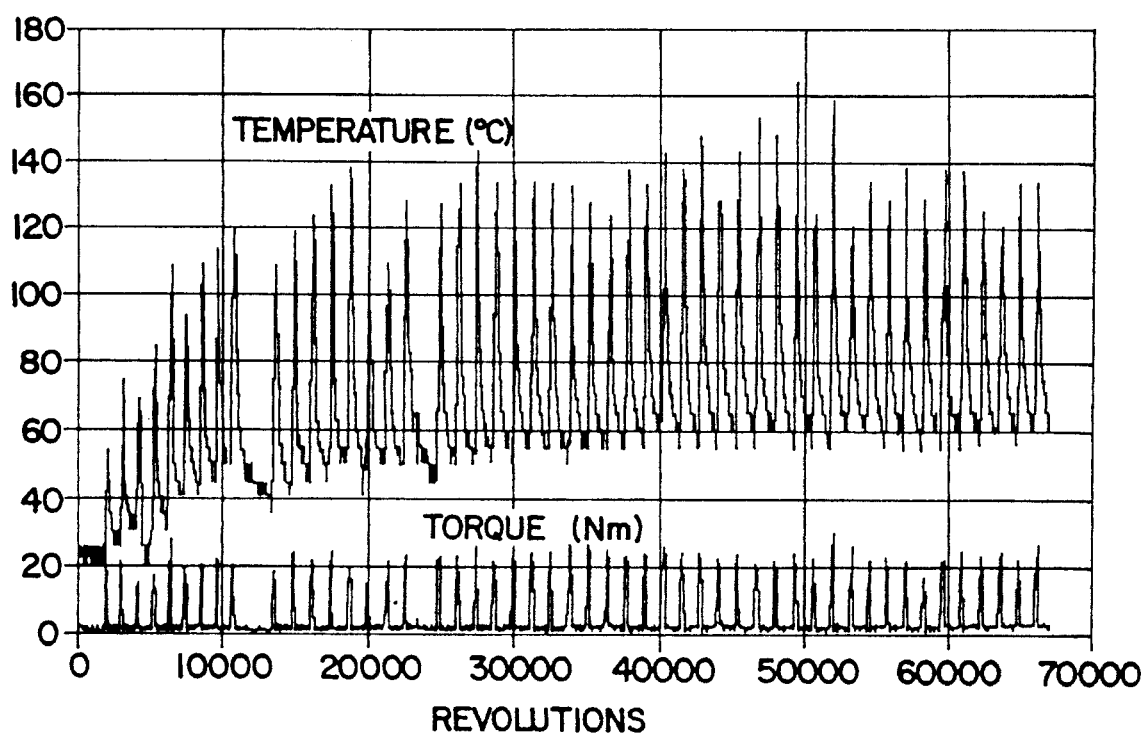

In order to examine the effect of the friction reducing layer according to the invention, the occurrence of slip as a result of an axial shock load was simulated in a laboratory setting. To this end two concentric outer rings of the same size were rotated at a speed of 2058 rpm, while an inner ring, not in contact with these two outer rings, concentrically placed between them and of the same size, did not rotate. Then by means of a hydraulic system the two outer rings were pressed against the inner ring with a force of 825 N. This process was repeated, whereby the force was applied for 5 seconds and subsequently removed for 30 seconds. The temperature was measured as close to the contact surfaces as possible between an outer ring and the inner ring. It will be appreciated that at the actual contact surfaces much higher temperatures are reached, affecting the material properties of the contact surfaces. Measuring the temperatures at the actual contact surfaces is very difficult, while taking measurements near the contact surfaces is much simpler and yet gives sufficient indication for the temperatures occurring at the contact surfaces. In FIG. 3a the temperature variations for uncoated rings, as well as the torque measured with the aid of a sensor, are plotted as a function of the number of revolutions of the outer rings. It can be seen that the temperature fluctuates between about 60° and 130° C. The torque, which is a measure of the amount of friction, is about 20 Nm. After about 67,000 revolutions a white layer developed followed by the formation of microcracks. The experiment was then stopped.

In concurrence with the invention the contact surfaces of the inner ring were provided with a 0.5 mm thick layer of molybdenum (FIG. 3b) or bronze (FIG. 3c) applied by wire spraying. Thereupon about 0.1 mm were turned off, leaving a layer having a thickness of about 0.3 to 0.4 mm.

Figure 3B:
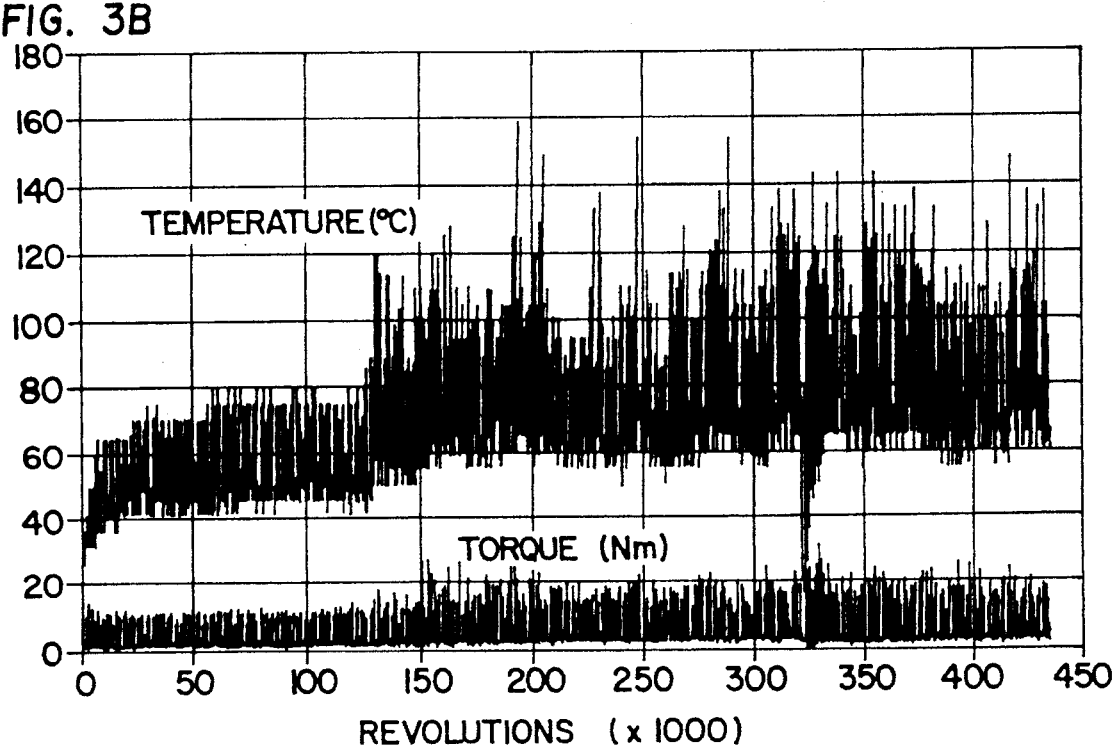
FIGS. 3b and 3c show the effect on the temperature when one of two contact surfaces facing each other is coated with a bronze layer, or a molybdenum layer respectively.

The temperature variations represented in FIG. 3b for a contact surface coated with molybdenum show that there is much less temperature fluctuation, particularly at the beginning, and that less high temperatures are reached. Ultimately the temperature varies in the range of 60° to about 110° C. After roughly 430,000 revolutions the molybdenum layer has practically disappeared and the torque has reached a value of about 20 Nm. Compared with the uncoated inner rings from the experiment described above, the rings of which one contact surface is coated with molybdenum, last about 6 times longer.

Figure 3C:
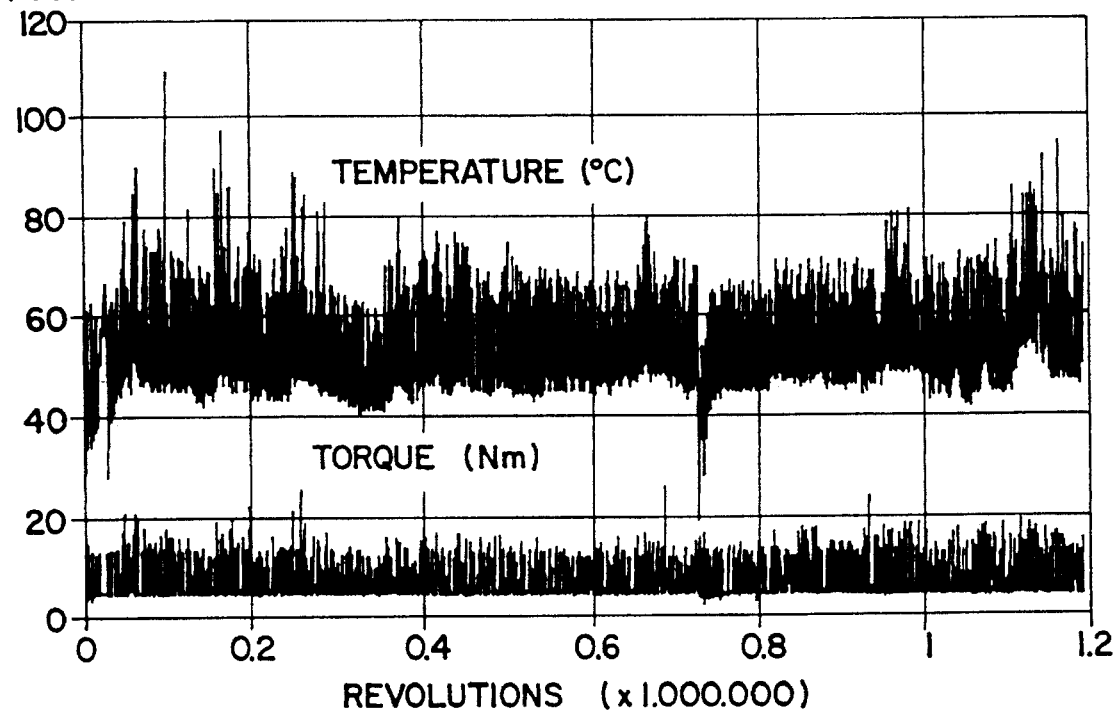

FIG. 3c shows the temperature variations in an inner ring coated with bronze (Sprabronze AA). For 1.2 million revolutions the temperature fluctuates between about 45° and 85° C. The torque clearly lies below 20 Nm, even toward the end of the experiment, when the bronze coating has nearly completely disappeared. On average, when one contact surface of the rings is coated with bronze, they last 20 times longer than when the rings are uncoated.

These examples show that by applying a friction-reducing layer according to the invention, the extent of the temperature fluctuation is decreased and problematic high values are reached only much later. The life of the rings, that is to say until a white layer has formed and microcracks develop, is greatly extended, especially when bronze is used as coating material. The following Table shows the average life of the rings.

| Layer | life in rpm |
| --- | --- |
| bronze | 1,400,000 |
| molybdenum | 420,000 |
| uncoated | 70,000 |

In general the thickness of the friction-reducing layer is 0.1 to 1 mm, depending on the material that is used. Layers between 0.2 and 0.5 mm are preferred.

The friction-reducing layer will wear off during operation of the bearing arrangement, and in order get an indication of this, the friction-reducing layer may comprise a first and a second friction-reducing layer in different colours. To this end the inner race ring may first be provided with a thin layer of molybdenum followed by a thicker layer of bronze. When through wear the molybdenum layer becomes visible, the bearing must be replaced, which will happen before the bearing is damaged. As the bearing has remained undamaged, it is possible to provide the particular bearing part with a new friction-reducing layer, whereby remnants of a previous friction-reducing layer can be removed before coating the contact surface.

The invention is neither limited to the embodiments of bearing arrangements applied in the steel industry nor to the prevention of problems caused by axial shock loads.

We claim:

1. A bearing arrangement which is suitable for the absorption of shock loads and is provided with parts rotating concentrically relative to each other, which parts as a group comprise a roller bearing and further at least a second adjacent roller bearing and/or a housing part, whereby the parts can come into contact with each other at adjacent, facing contact surfaces, characterized in that of at least two adjacent contact surfaces facing each other one contact surface is coated with a friction-reducing layer.

2. A bearing arrangement according to claim 1, characterized in that the friction-reducing layer has a thickness 0.2 to 0.5 mm.

3. A bearing arrangement according to claim 1, characterized in that the friction-reducing layer contains bronze.

4. A bearing arrangement according to claim 1, characterized in that the friction-reducing layer contains molybdenum.

5. A bearing arrangement according to claim 1, characterized in that the friction-reducing layer comprises a first and a second friction-reducing layer in different colors.

6. A bearing arrangement according to claim 1, provided with at least one taper roller bearing and being suitable for the absorption of axial shock loads, characterized in that the coated contact surface is part of a radially extending lateral surface of at least one of the parts.

7. A bearing arrangement according to claim 6, provided with two press-on parts holding together a double taper roller bearing which has on either side a cylindrical roller bearing, with each roller bearing comprising an inner race ring and an outer race ring, characterized in that the inner race ring of the double taper roller bearing has on either side of the inner race ring radially extending lateral surfaces on the contact surfaces coated with a friction-reducing layer.

8. A roller bearing for use in a bearing arrangement according to claim 1, characterized in that each contact surface is coated with a friction-reducing layer.

\* \* \* \* \*